(No Model.) 3 Sheets—Sheet 1.
W. S. ELLIOTT.
ELECTRIC LOCOMOTIVE.
No. 580,598. Patented Apr. 13, 1897.
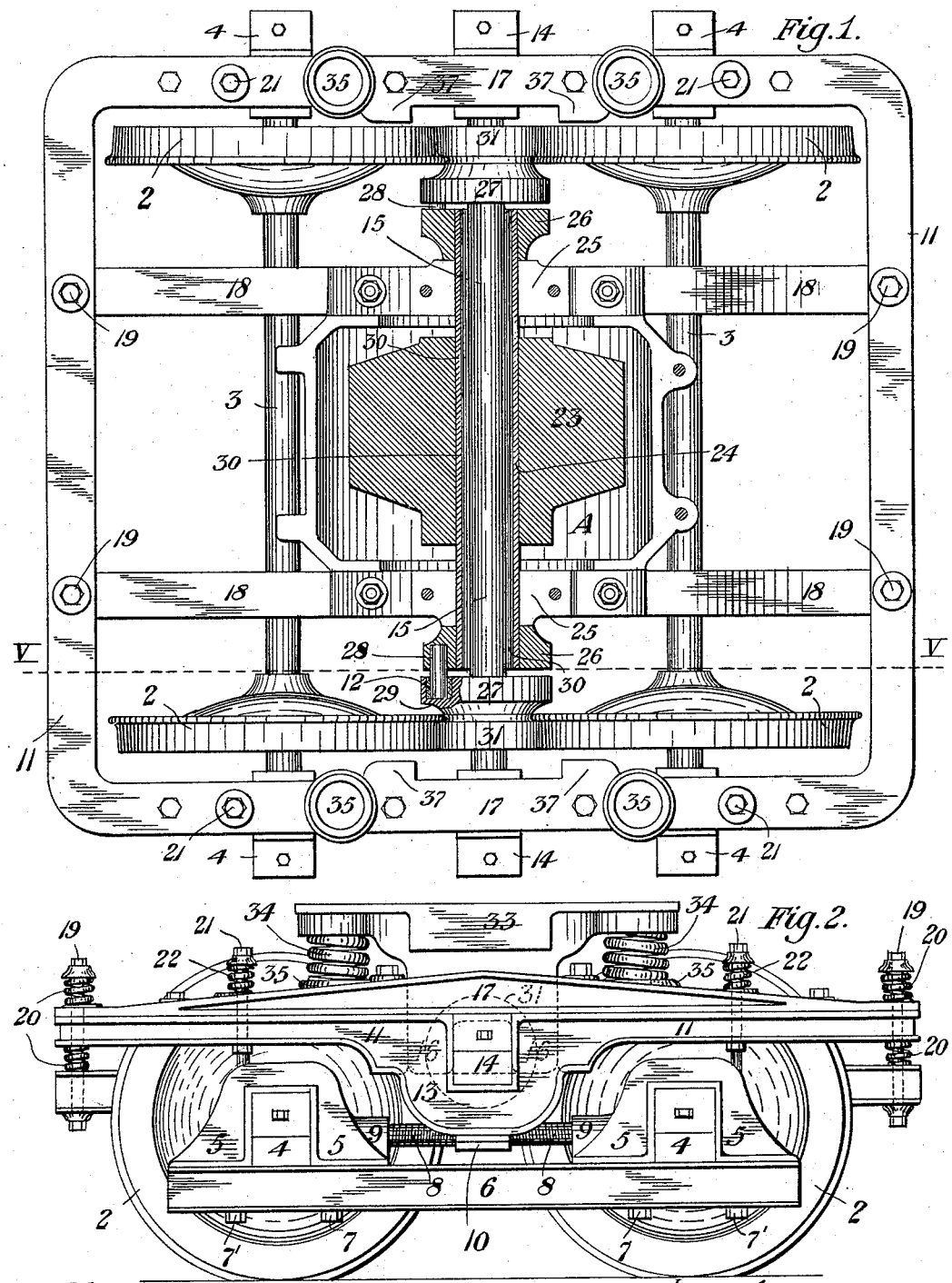
Witnesses:
Inventor.
William S. Elliott
by O. M. Clarke
his Attorney.

(No Model.) 3 Sheets—Sheet 2.

W. S. ELLIOTT.
ELECTRIC LOCOMOTIVE.

No. 580,598. Patented Apr. 13, 1897.

Witnesses:
Peter J. Edwards
Geo. M. Harton

Inventor.
William S. Elliott
by O. M. Clarke
his Attorney.

(No Model.) 3 Sheets—Sheet 3.
W. S. ELLIOTT.
ELECTRIC LOCOMOTIVE.
No. 580,598. Patented Apr. 13, 1897.
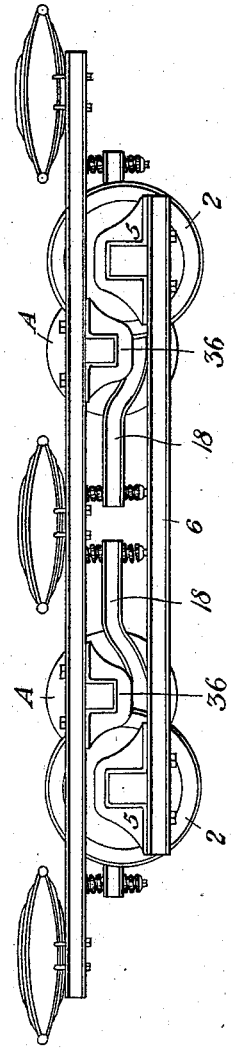
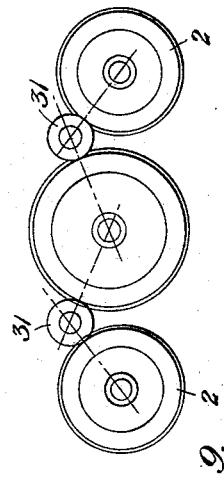
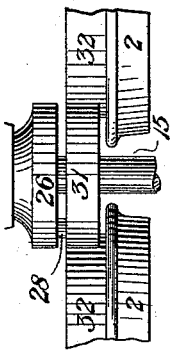
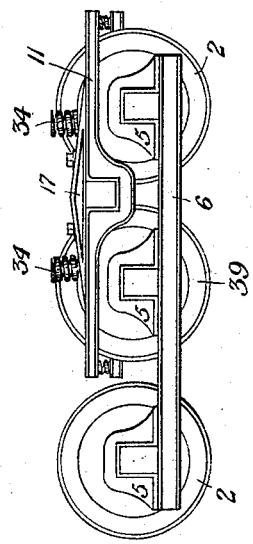
Witnesses:
Peter J Edwards
Geo. M. Harton
Inventor.
William S. Elliott.
by O. M. Clarke
his Attorney.

UNITED STATES PATENT OFFICE.

WILLIAM S. ELLIOTT, OF PITTSBURG, PENNSYLVANIA.

ELECTRIC LOCOMOTIVE.

SPECIFICATION forming part of Letters Patent No. 580,598, dated April 13, 1897.

Application filed June 27, 1896. Serial No. 597,104. (No model.)

*To all whom it may concern:*

Be it known that I, WILLIAM S. ELLIOTT, a citizen of the United States, residing at Pittsburg, in the county of Allegheny and State of Pennsylvania, have invented or discovered a new and useful Improvement in Electric Locomotives, of which the following is a full, clear, and exact description, reference being had to the accompanying drawings, forming part of this application, in which—

Figure 3:
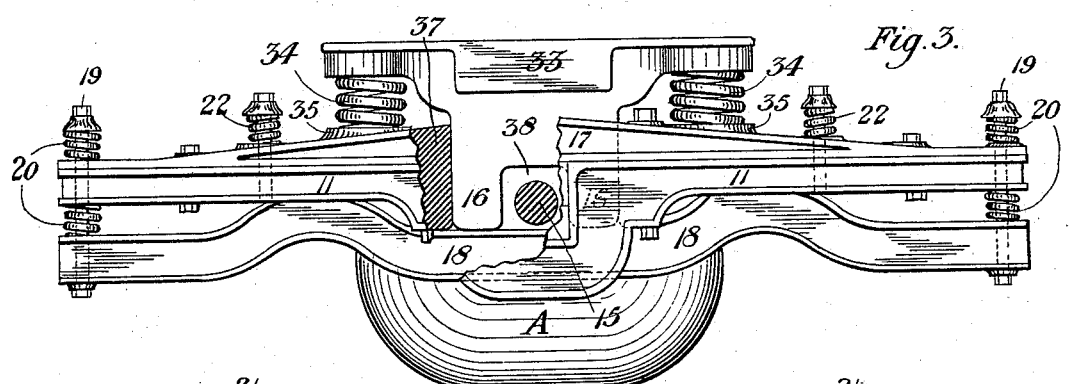
Figure 4:
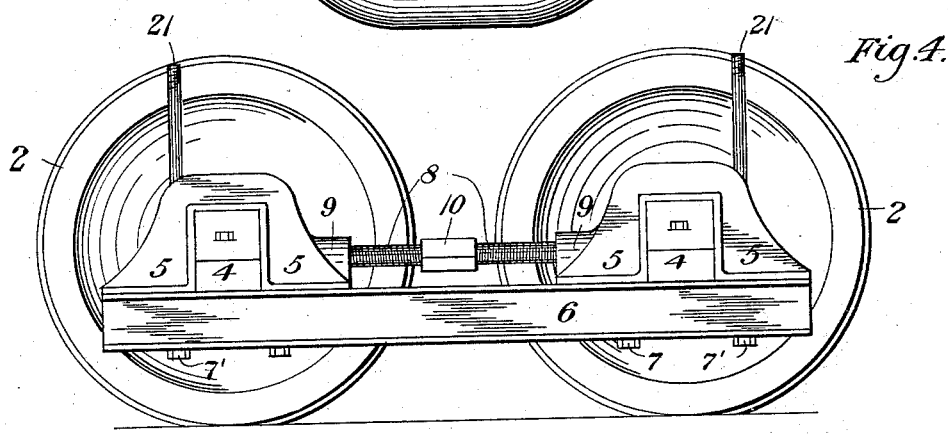
Figure 5:
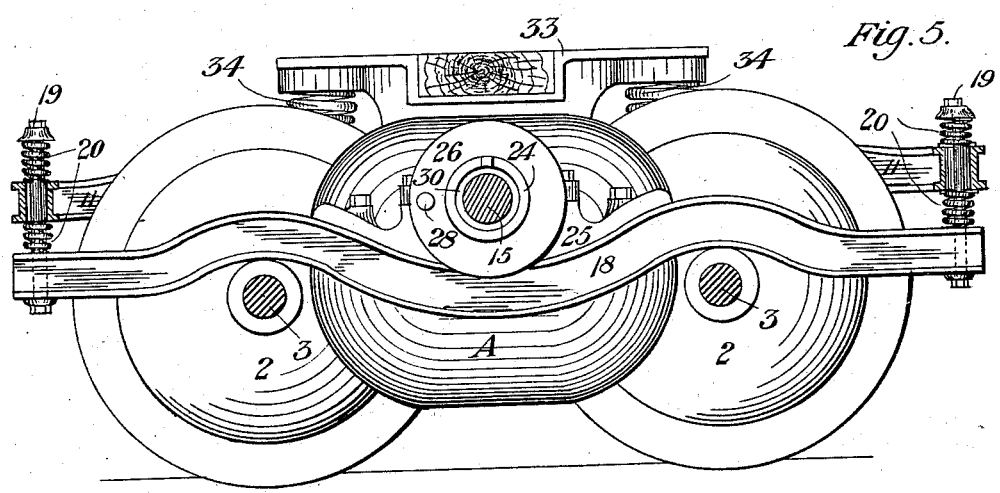

Figure 1 is a plan view of my improved railway-truck and driving mechanism, the bolster being removed and the motor and its driving-spindle being shown in section. Fig. 2 is a side elevation thereof. Fig. 3 is a side elevation of the upper part of the truck-frame and the motor removed from the lower truck. Fig. 4 is a similar view of the lower truck. Fig. 5 is a vertical longitudinal section on the line V V of Fig. 1. Fig. 6 illustrates in side elevation a modified construction adapted to a four-wheel truck. Fig. 7 is a diagrammatic view illustrating in side elevation a further modification, the truck-frame being removed, such as would be used on six-wheel trucks or six-wheel locomotives using two motors to drive three axles. Fig. 8 is a view in side elevation, showing a similar arrangement of wheels which may be used to prevent derailment should the wheel-base be less than the gage of the track. Fig. 9 is a detached plan view illustrating in detail a modification in the manner of driving friction-gear.

Similar numerals of reference refer to like parts wherever used throughout this specification.

My invention relates to the construction of electric locomotives and trucks for electric railways, and refers particularly to the manner in which the motor is mounted on its supporting-framework and to the means by which variations in the superimposed load may be provided for and the amount of frictional contact of the driving mechanism controlled and utilized, together with such driving mechanism as shall now be more particularly described and claimed.

Referring to the drawings, 2 2 are the car-wheels, secured to the axles 3, having suitable bearings in the usual boxes 4, mounted in housings 5, set upon the side members 6, which may be of any preferred construction, as I-beams, channels, box-girders, or forgings. The housings 5 are secured to the members 6 by bolts 7, so as to permit of longitudinal adjustment thereon, and right and left hand threaded screws 8 are secured in bosses 9 on the inner sides of the housings, a turnbuckle or nut 10 engaging their ends by which the opposite housings, and consequently the boxes 4 and axles 3, mounted therein, may be adjusted toward or from each other.

The upper or secondary independent frame 11, serving to support the motor and car-body, is constructed, preferably, of wrought metal, and at the middle portion of each side are suitable housings 13 for the boxes 14, in which are journaled the ends of the driving-disk shaft 15. Longitudinal upper brace members 17 serve to strengthen the sides of the frame 11 in the manner of a truss, the parts being held securely together by bolts or rivets. Two longitudinal members 18 18 are supported from the ends of the frame 11 by bolts 19, having upper and lower equalizing-springs 20, arranged in the usual manner, and upon these members 18 is mounted the driving-motor A.

It is obvious that the longitudinal members 18 may be made integral with the motor frame or fields, if desired.

Extensions 21 of the outer bolts 7' project upwardly through the frame 11 and 17, provided with cushioning-springs 22, and serve to retain the upper truck-frame against undue movement in its relation to the lower truck.

The armature 23 of the motor A is secured to a hollow spindle 24, surrounding the driving-disk shaft 15, the spindle resting in bearings 25 at each end, secured to the suspended longitudinal members 18, in which bearings it is free to rotate within the fields and inclosing case. Crank-disks 26 are secured to outer ends of the spindle 24, closely adjacent to similar coupling-disks 27, secured to the shaft 15, and a crank-pin 28, secured to the disk 26, projects into a hole 29 in the disk 27 of considerably larger diameter than the diameter of the pin, the excess of space being filled with a flexible cushioning substance 12, allowing for variations in alinement of the spindle and shaft, the internal diameter of the spindle being made proportionately greater than that of the shaft 15, leaving a space 30 for the same purpose. If preferred, any other desired form of flexible connection may be employed between the shaft 15 and hollow spindle 24, such as a pin or key, and I desire to include such alternative construction within the scope of my invention.

As a means of transmission of power from the motor through the spindle 24 and disks 26 and 27, to the car-wheels I employ friction-disks 31, secured to the ends of the shaft 15 or made integral with the coupling-disk 27, such disks 31 bearing upon the faces of the wheels 2 and transmitting rotary motion to them by frictional contact, resulting in their rotation and consequent movement of the car.

I have shown in Fig. 9 a modified construction in which special friction-wheels 32 are employed, secured to the axles 3, as is customary with the usual pinion-gearing commonly employed, or the wheels may be made integral with the car-wheel, if desired. This construction has the advantage of freedom from uneven wear, to which the car-wheels are subject by reason of brake action and wear upon the rail, while the width of the wheel 32 may be increased, if desired, and kept true and clean for the purposes in view.

A suitable bolster-frame 33 is mounted upon springs 34, resting in nests 35 on the upper side of the frame 17, upon which the upper structure of the car may be supported in any desired or preferred manner. This bolster is provided at each end with downwardly-projecting draft-bearing extensions 16, fitting between lugs 37 on the inside of the frame 11, thereby insuring a positive connection between the bolster and the truck-frame, while allowing of vertical movement upon the springs 34, the extensions being cut out at 38 to allow axle-space. When so mounted in place, it will be seen that the weight of the car and motor and the upper framework will be transmitted through the boxes 14 to the disks 31, which bear directly against the wheels 2 or 32, the amount of friction being thereby automatically regulated by the varying weight of the car and its contents, so as to be greater or less in proportion to the greater or less power required to propel the car.

In cars employing but four wheels, as shown in Fig. 6, each motor-shaft is set in close proximity to the front and back wheels, respectively, and the friction-disks bear upon but one wheel, being held securely to the work by housings 36.

In trucks or electric locomotives employing three sets of wheels, two driving shafts and axles may be used, being located between the wheels, as in Fig. 7, the center wheel being proportionately large, as shown, so that the angular relation between the center of the driving-disks and that of the driven wheels, varying with the varying diameters of the wheels in contact with the driving-wheel, will cause the driving-disks to bear with varying pressures upon the respective wheels, so that each wheel will present approximately the same total amount of friction.

Fig. 8 shows an arrangement that may be employed when it is necessary to mount the car-body as low as possible, necessitating the use of small car-wheels. In such cases the wheel-base of the driven wheels may be less than the width of the track, under which conditions the liability to derailment would be great at high speeds. In order to overcome this, I use a third set of wheels 39 as pilot-wheels or guides, so as to increase my wheel-base to suit the conditions, the driving shaft and disk 31 being located between any two of the wheels so arranged.

It is obvious that my construction of truck and principle of transmission of power by friction may be applied to and utilized in many other forms of wheeled vehicles—as, for instance, in electric cranes, hoisting and conveying apparatus, &c.—and all such variations are to be considered as within the scope of my invention.

The advantages of my invention will be appreciated by those skilled in the art, as by its use I am enabled to dispense with the usual toothed gearing and gear-cases, which are objectionable on account of noise, wear, and consequent expense of renewal, whereas by my arrangement of friction-disks there is very little wear, while the operation is comparatively noiseless, very simple and direct, and not likely to get out of order.

Changes and modifications may be made by the skilled mechanic in the shape and arrangement of the truck and location of the driving mechanism, and I do not desire to be limited to the construction shown in the drawings, but to include any equivalent therefor.

Having described my invention and in what manner it is constructed and operates, what I claim, and desire to secure by Letters Patent, is—

1. In a truck-frame comprising an upper motor and car-supporting framework, and friction driving mechanism supported upon the wheels; and a lower framework provided with housings and car-axle boxes mounted in the housings, means for adjusting the housings toward or from each other, substantially as set forth.

2. A car-truck frame comprising longitudinal side members provided with housings, axle-boxes mounted in the housings, an upper framework provided with journal-boxes in the side members forming bearings for a power-shaft, longitudinal motor-supporting members suspended from the frame, and a power-shaft provided with friction-disks bearing on the faces of the supporting-wheels, substantially as set forth.

3. A car-truck frame comprising longitudinal side members provided with housings, axle-boxes mounted in the housings, an upper framework provided with journal-boxes in the side members forming bearings for a power-shaft, longitudinal motor-supporting members suspended from the frame, and a bolster supported upon springs resting on the rectangular frame, with downwardly-projecting draft-bearings embraced by the framework, substantially as set forth.

4. In combination with a car-truck frame comprising longitudinal side members, provided with housings, axle-boxes mounted in the housings, an upper framework provided with journal-boxes in the side members forming bearings for a power-shaft, and longitudinal motor-supporting members suspended from the frame; a hollow armature-shaft and a driving-shaft flexibly connected therewith, and having friction-disks mounted on its ends bearing against the faces of the supporting-wheels of the truck, substantially as set forth.

5. In combination with a truck, a hollow armature-shaft provided with a crank-disk, a driving-shaft mounted within the hollow shaft carrying a friction-disk, and a crank-pin projecting from the crank-disk into a cavity in the friction-disk, with a resilient interposing packing surrounding the pin, substantially as set forth.

6. In combination with a car-truck frame comprising longitudinal side members provided with housings, axle-boxes mounted in the housings, an upper framework provided with journal-boxes in the side members forming bearings for a power-shaft, and longitudinal motor-supporting members suspended from the frame; a hollow armature-shaft, a power-shaft passing through the armature-shaft bearing friction-disks at each end, with a flexible connection between the armature crank-disk and the power-shaft, substantially as set forth.

7. In combination with a truck and a motor suspended therefrom, a hollow armature shaft, crank-disks secured to each end of the armature-shaft, a power-shaft passing through the armature-shaft, clearance-space between the power-shaft and the armature-shaft, disks secured to the power-shaft, and crank-pins secured to the crank-disk projecting into cushioned holes in the power-shaft disks of a larger diameter than the diameter of the crank-pins, substantially as set forth.

8. In an electric car-truck or locomotive, the combination therewith of a motor flexibly suspended or supported therefrom or thereon, a hollow armature-shaft, a power-shaft passing through the hollow armature-shaft and flexibly connected thereto, friction-disks secured to the power-shaft and resting on the faces of the supporting-wheels of the truck, in a plane parallel with that of the wheels, the friction existing between the power-disks, and the supporting-wheels being created by the weight of the car-motor and supporting-frame and utilized as a means to transmit the power developed by the motor to the wheels for the purpose of propelling the car, substantially as set forth.

9. In an electric locomotive the combination of the truck, the motor suspended therefrom, longitudinal side members located below the truck provided with adjustable housings, axle-boxes mounted in the housings, a power-shaft journaled in bearings in the upper framework flexibly connected with a hollow armature-shaft provided with friction-disks bearing on the faces of the truck-supporting wheels, and an independent motor-supporting frame supported from the upper framework, substantially as set forth.

In testimony whereof I have hereunto set my hand this 17th day of June, 1896.

WILLIAM S. ELLIOTT.

Witnesses:
PETER J. EDWARDS,
C. M. CLARKE.